US009495546B2

(12) United States Patent
Marien

(10) Patent No.: US 9,495,546 B2
(45) Date of Patent: Nov. 15, 2016

(54) ELECTRONIC SIGNING METHODS, SYSTEMS, AND APPARATUS

(71) Applicant: VASCO DATA SECURITY, INC., Oakbrook Terrace, IL (US)

(72) Inventor: Dirk Marien, Ranst (BE)

(73) Assignee: Vasco Data Security, Inc., Oakbrook Terrace, IL (US)

(*) Notice: Subject to any disclaimer, the term of this patent is extended or adjusted under 35 U.S.C. 154(b) by 106 days.

(21) Appl. No.: 14/575,068

(22) Filed: Dec. 18, 2014

(65) Prior Publication Data
US 2015/0186658 A1 Jul. 2, 2015

Related U.S. Application Data

(60) Provisional application No. 61/922,128, filed on Dec. 31, 2013.

(51) Int. Cl.
G06F 21/00 (2013.01)
G06F 21/60 (2013.01)
H04L 9/32 (2006.01)
H04L 9/00 (2006.01)
H04L 29/06 (2006.01)

(52) U.S. Cl.
CPC .......... G06F 21/602 (2013.01); H04L 9/006 (2013.01); H04L 9/3228 (2013.01); H04L 9/3234 (2013.01); H04L 9/3247 (2013.01); H04L 9/3263 (2013.01); H04L 63/067 (2013.01); H04L 63/0823 (2013.01); H04L 63/0853 (2013.01); H04L 63/0435 (2013.01); H04L 63/0442 (2013.01); H04L 63/0838 (2013.01); H04L 63/0861 (2013.01)

(58) Field of Classification Search
CPC ............. G06F 21/602; H04L 63/0823; H04L 9/3228; H04L 63/0853; H04L 9/3234; H04L 9/3263; H04L 9/006; H04L 63/067; H04L 9/3247; H04L 63/0861; H04L 63/0838; H04L 63/0435; H04L 63/0442
See application file for complete search history.

(56) References Cited

U.S. PATENT DOCUMENTS

| 8,782,407 | B2 * | 7/2014 | Kuno ................. G06F 12/1458 713/156 |
| 2002/0184259 | A1 * | 12/2002 | Akishita ................ G06F 21/10 715/201 |
| 2002/0188855 | A1 * | 12/2002 | Nakayama ............. G06F 21/32 713/186 |
| 2003/0177353 | A1 * | 9/2003 | Hiltgen ................. G06F 21/34 713/161 |
| 2003/0177392 | A1 * | 9/2003 | Hiltgen ................. G06F 21/34 713/172 |
| 2005/0065932 | A1 * | 3/2005 | Rocha .................... G06F 21/34 |
| 2006/0020706 | A1 * | 1/2006 | Kamiya ................ G06K 7/0008 709/229 |
| 2006/0072144 | A1 * | 4/2006 | Dowling .............. G06F 21/606 358/1.15 |
| 2006/0106836 | A1 * | 5/2006 | Masugi ................... G06F 21/33 |
| 2006/0209333 | A1 * | 9/2006 | Takida ................... G07C 13/02 358/1.15 |
| 2008/0263363 | A1 | 10/2008 | Jueneman et al. |
| 2009/0006845 | A1 * | 1/2009 | Charbonnier ........... H04L 63/10 713/156 |
| 2009/0276474 | A1 * | 11/2009 | Sela .................. G06F 17/30218 |
| 2009/0276829 | A1 * | 11/2009 | Sela ........................ G06F 21/10 726/2 |
| 2011/0314304 | A1 | 12/2011 | Braams |
| 2013/0119130 | A1 * | 5/2013 | Braams ................. G06K 7/042 235/382 |
| 2014/0165134 | A1 * | 6/2014 | Goldschlag ............ G06F 21/60 726/1 |
| 2015/0103383 | A1 * | 4/2015 | Dowling ............ H04N 1/00225 358/402 |

OTHER PUBLICATIONS

International Search Report and Written Opinion for PCT/US2014/071088 mailed Mar. 11, 2015.

* cited by examiner

Primary Examiner — Mahfuzur Rahman
(74) Attorney, Agent, or Firm — RatnerPrestia

(57) ABSTRACT

Methods, apparatus, and systems for generating digital signatures are disclosed. An apparatus may present itself to a host computer as a mass storage device to provide cryptographic processing results through a standard mass storage access mechanism for exchanging files.

33 Claims, 3 Drawing Sheets

ELECTRONIC SIGNING METHODS, SYSTEMS, AND APPARATUS

CROSS REFERENCE TO RELATED APPLICATIONS

This application claims priority to U.S. Provisional application Ser. No. 61/922,128 entitled Electronic Signing Methods, Systems and Apparatus, filed on Dec. 31, 2013, the contents of which are incorporated fully herein by reference.

FIELD OF THE INVENTION

The invention relates to securing remote access to computers and applications and remote transactions over computer networks. More specifically, the invention relates to methods and apparatus for generating electronic signatures.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, how to ensure that transaction data has not been altered before being received at an application server, and how to guarantee that an individual, once having engaged in a transaction, is not in a position to repudiate it.

In the past, application providers have relied on static passwords to provide the security for remote applications. In recent years it has become evident that static passwords are not sufficient and that more advanced security technology is required.

One solution is to digitally sign data such as electronic files (e.g., an electronic document) using an asymmetric digital signing algorithm that is parameterized with the private key of a public-private key pair. This may for example happen using a Public Key Infrastructure (PKI). In a Public Key Infrastructure one associates a public-private key pair with each user. The key pair is associated with a certificate (issued by a trusted Certificate Authority) that binds that public-private key pair to a specific user. By using asymmetric cryptography this public-private key pair can be used to: authenticate the user; sign transactions, documents, e-mails (so as to prevent repudiation); set up encrypted communication channels; and decrypt messages or documents that have been encrypted by a sender using the public key of the recipient.

In many cases a user interacts with an application using a general purpose computing device (such as for example a personal computer). At some point in the interaction with the application, the user may be requested to electronically sign an electronic file with a private key associated with the user.

For security purposes the private key of the user is often stored on a separate key storage device that is adapted to securely store a private key of a user. In most cases the key storage device is also adapted to carry out cryptographic calculations according to an asymmetric cryptographic algorithm using the stored private key. Examples of such key storage devices include PKI smart cards and PKI USB (Universal Serial Bus) tokens. Usually the general purpose computer of the user interacts with a smart card using a smart card reader. In most cases these smart card readers have to be connected to the general purpose computer with a USB interface. PKI USB tokens often combine the functionality of USB smart card reader and a PKI smart card in a single dongle-like device.

In most cases the application interfaces through a standard cryptographic API (Application Programming Interface), such as for example MS-CAPI (Microsoft Cryptography API) or PKCS#11 (Public Key Cryptographic Standard 11), with a cryptographic library that offers high level cryptographic services to the application (such as signing or decrypting an electronic file) and the cryptographic library translates the high level application requests in a series of commands-responses that it exchanges with the smart card of the user that holds the private key associated with the user.

There are however a number of problems with this solution. For the solution to work, the PC that the user uses must have such a cryptographic library, but many PCs (Personal Computers) don't have such a cryptographic library by default, which means that the user must install a cryptographic library. Additionally, in practice the interface between a smart card and the cryptographic library is not standardized which means that the user must install the specific cryptographic library that is compatible with the specific smart card of the user. Moreover, while most PCs do support USB, they often don't have support by default for USB smart card readers so that the user must also install a USB driver for smart card readers that is compatible with the smart card reader that happens to be available to the user. This combination of installation requirements in practice often turns out either to be too complicated for many users to begin with in the first place or to result in failed installations leading to unreliable or even not working systems.

What is needed is a solution for signing electronic files with the private key of a user that doesn't require the user to install specific hardware and software on the general purpose computing device of the user.

DISCLOSURE OF THE INVENTION

The invention is based on an insight of the inventors that while many PCs don't support by default USB smart card readers, they almost invariably support the USB Mass Storage Device class.

One aspect of the invention provides an apparatus comprising: a communication interface for locally connecting the apparatus to a host computer and a data processing component adapted to provide a cryptographic processing result generated by cryptographically combining a cryptographic secret key with first input data; whereby the apparatus may be adapted to present itself to said host computer—when it is connected to said host computer by the communication interface—as a mass storage device that an application on the host computer can access through a standard mass storage access mechanism for exchanging files; and the communication interface may be adapted to return an output file to said host computer over said communication interface whereby said output file may comprise the cryptographic processing result, and said host computer may obtain said output file by reading the output file from the apparatus over said communication interface through a mechanism for reading files of said standard mass storage access mechanism.

In some embodiments said communication interface may comprise a USB interface and the apparatus may be further adapted to present itself to the host computer—when the apparatus is connected to the host computer—as a USB device of the USB Mass Storage Device class.

In some embodiments the apparatus may be an apparatus of any of the previous embodiments further comprising: a memory component adapted to store said cryptographic secret key; a data processing component adapted to perform cryptographic calculations with said cryptographic secret key; whereby said cryptographically combining said cryptographic secret key with said first input data may comprise said data processing component performing said cryptographic calculations.

In some embodiments the apparatus may be an apparatus of any of the previous embodiments further comprising: a second communication interface for receiving and exchanging commands and responses with an external removable key storage device, said key storage device comprising a key storage device memory component adapted to store said cryptographic secret key and a key storage device data processing component adapted to perform cryptographic calculations with said cryptographic secret key; whereby said cryptographically combining said cryptographic secret key with said first input data may comprise said key storage device data processing component performing said cryptographic calculations with said cryptographic secret key.

In some embodiments said second communication interface may comprise a smart card interface, which may be compatible with the ISO/IEC (International Organization for Standardization/International Electrotechnical Comission) 7816 set of standards (in particular ISO/IEC 7816-2 & ISO/IEC 7816-3), and said commands and responses may comprise smart card commands and responses, e.g. smart card APDUs (Application Protocol Data Units), and said key storage device may be a smart card such as a PKI (Public Key Infrastructure) smart card capable of performing asymmetric cryptographic. In some embodiments the second communication interface may comprise an externally accessible smart card slot for receiving smart cards of the ISO/IEC 7810 ID-1 format and the key storage device may be a ISO/IEC 7816 compatible smart card of the ISO/IEC 7810 ID-1 format. In some embodiments the smart card may be compatible with the ISO/IEC 7816-15 standard.

In some embodiments the apparatus may be an apparatus of any of the previous embodiments further comprising a user input interface for a user of said apparatus to indicate an approval, whereby the apparatus may be adapted to capture by said user input interface said approval by the user and whereby at least one of said cryptographically combining of the secret key with the first data or said returning of the at least one output file comprising the result of said cryptographically combining may be conditional on the apparatus obtaining said approval.

In some embodiments the apparatus may be an apparatus of any of the previous embodiments wherein said cryptographic secret key may comprise a symmetric secret key that is shared with an application and whereby said cryptographically combining said cryptographic secret key with said first input data may comprise performing on said first input data a symmetric cryptographic algorithm parameterized with said symmetric secret key. In some embodiments said symmetric cryptographic algorithm may comprise a symmetric encryption or decryption algorithm such as AES (Advanced Encryption Standard). In some embodiments said symmetric cryptographic algorithm may comprise a keyed hashing algorithm such as HMAC (Hash-based Message Authentication Code).

In some embodiments the apparatus may be an apparatus of any of the previous embodiments wherein said cryptographic secret key comprises a secret private key of an asymmetric public-private key pair and whereby said cryptographically combining said cryptographic secret key with said first input data comprises performing on said first input data an asymmetric cryptographic algorithm, such as for example RSA (Rivest-Shamir-Adleman), parameterized with said secret private key.

In some embodiments the apparatus may be further adapted to make available to said host computer a public key file that comprises a public key of said public-private key pair and whereby said host computer obtains said public key file by reading the public key file from the apparatus over said communication interface through said mechanism for reading files. In some embodiments the public key file may be the same as the output file. In other embodiments the public key file may be another file than the output file. In some embodiments the public key file contain the public key in a standardized format such as for example according to PKCS#1.

In some embodiments the apparatus may be further adapted to make available to said host computer a certificate file that comprises one or more certificates associated with said public-private key pair and whereby said host computer obtains said certificate file by reading the certificate file from the apparatus over said communication interface through said mechanism for reading files. The certificate may have been generated by a Certificate Authority. In some embodiments the certificate file may comprise a certificate chain. In some embodiments the apparatus may have more than one certificate files with more than one certificate. In some embodiments the certificate file may be the same as the output file or the public key file. In other embodiments the certificate file may be another file than the output file and the public key file. In some embodiments a certificate file may comprise a certificate in a standardized format such as for example described in the X.509 standard.

In some embodiments the apparatus may be an apparatus of any of the previous embodiments further adapted to generate a one-time password whereby said one-time password is comprised in said result of said cryptographically combining of said cryptographic secret key with said first input data and whereby said first input data comprises a dynamic variable.

In some embodiments the apparatus may further comprise a clock and said dynamic variable may be based on a time value provided by said clock.

In some embodiments the apparatus may be further adapted to store a second variable, to determine a value of said dynamic variable as a function of said stored second variable; and to update and store the value of the second variable when the value of the second variable has been used for said combining. In some embodiments the apparatus may further comprise a storage component and may be further adapted to: store in said storage component said second variable; determine a value of said dynamic variable as a function of said stored second variable; update and store in the storage component the value of the second variable when the value of the second variable has been used for said combining, for example for generating a one-time password. In some embodiments said second variable may comprise a counter and updating said second variable may comprise monotonically increasing (or incrementing) or monotonically decreasing (or decrementing) the value of said counter. For example in some embodiments the dynamic variable may be a counter that the apparatus may store in its memory and that it may increment (or decrement) by one each time that the apparatus generates a one-time password.

In some embodiments the apparatus may be adapted to generate the one-time password (OTP) after the apparatus has received a request from the host computer to read the output file comprising the one-time password and may after generation of the one-time password generate the output file containing the generated one-time password and return the generated output file to the host computer. In other embodiments the apparatus may be adapted to store a current value of the one-time password in a persistent memory and may upon receiving second variable a request from the host computer to read the output file comprising the one-time password generate the output file containing the stored one-time password and return that output file with the stored one-time password to the host computer and may then (after returning the output file) generate a new value for the one-time password and update the stored value of the one-time password with that newly generated value before it receives a following request from a host computer to read the output file. In other words, in some embodiments the apparatus may generate the one-time password between receiving a request to read the output file containing that one-time password and returning the output file containing that one-time password, while in other embodiments the apparatus may generate a new one-time password value after returning an output file containing a previous value of the one-time password and before receiving a request to read the output file containing the newly generated one-time password.

In some embodiments the apparatus may be an apparatus of any of the previous embodiments further adapted to generate a digital signature over at least some contents of an input file whereby said communication interface may be further adapted to receive said input file from said host computer whereby said host computer may send the input file to the apparatus over said communication interface by saving the input file to the mass storage device presented by the apparatus through a mechanism for saving files of said standard mass storage access mechanism, said first input data may be based on a value that represents said at least some contents of the input file; and said digital signature may be comprised in said result of said cryptographically combining of said cryptographic secret key with said first input data. In some embodiments said at least some contents of said input file comprise the entire input file. I.e. in some embodiments the apparatus may be adapted to generate a signature over the entire input file. In some embodiments the digital signature may be a MAC (Message Authentication Code) which may be generated by the apparatus with a symmetric cryptographic algorithm. In some embodiments said cryptographic secret key may comprise a private key of a public-private key pair and said cryptographically combining said cryptographic secret key with said first input data may comprise the apparatus generating a hash of the at least some contents of the input file and processing this hash with an asymmetric cryptographic algorithm parameterized with said private key. In some embodiments said private key may be stored on an external removable key storage device and the apparatus may delegate cryptographic operations involving said private key (such as for example said processing of said hash with an asymmetric cryptographic algorithm parameterized with said private key) to the external removable key storage device.

In some embodiments the apparatus may comprise a user output interface for presenting outputs to a user of said apparatus and a user input interface for capturing inputs from said user. The apparatus may be further adapted to: recognize a format of at least one of a plurality of possible file type formats of said input file; read said at least some contents of said input file; present said at least some contents to said user by said user output interface; and capturing from said user by said user input interface an approval or a rejection by said user of said at least some contents presented to the user; whereby said cryptographically combining of the secret key with the first data or said returning of the at least one output file comprising the result of said cryptographically combining may be conditional on the apparatus obtaining said approval. The user output interface may for example comprise a display such as an LCD (Liquid Crystal Display). The user input interface may for example comprise a keyboard which may for example comprise an OK button for indicating approval and a Cancel button for indicating rejection. In some embodiments the input file may comprise data that for example may represent a transaction and the apparatus may present these data to the user for approval. If the user approves the presented data then the apparatus may go ahead with generating a signature over these data. If the user rejects the presented data then the apparatus may decline generating a valid signature. In some embodiments the input file may comprise the data to be signed in the form of a text and present the text to the user. For example in some embodiments the input file may comprise an ASCII (American Standard Code for Information Interchange) text.

In some embodiments the apparatus may be an apparatus of any of the previous embodiments further adapted to encrypt or decrypt at least some contents of an input file whereby said communication interface may be further adapted to receive said input file from said host computer whereby said host computer may send the input file to the apparatus over said communication interface by saving the input file to the mass storage device presented by the apparatus through a mechanism for saving files of said standard mass storage access mechanism; said first input data may comprise said at least some contents; and said cryptographically combining of said cryptographic secret key with said first input data may comprise encrypting or decrypting said first input data with an encryption or decryption algorithm that may be parameterized with said cryptographic secret key. In some embodiments said encryption or decryption algorithm may comprise a symmetric encryption or decryption algorithm such as for example AES. In some embodiments said at least some contents of said input file comprise the entire input file. In some embodiments the apparatus may be adapted to encrypt or decrypt the entire input file.

In some embodiments the apparatus may be an apparatus of any of the previous embodiments further comprising a user input interface for a user of said apparatus to provide to said apparatus a PIN and/or password value; said apparatus may be further adapted to obtain from said user said PIN and/or password value by said user input interface and to verify whether said PIN and/or password is correct; whereby said cryptographically combining of the secret key with the first data or said returning of the at least one output file comprising the result of said cryptographically combining may be conditional on said PIN and/or password value provided by the user being correct. In some embodiments the apparatus may be adapted to verify a PIN and/or password entered by the user and the apparatus may be adapted to only proceed with cryptographically combining of the secret key with the first data (e.g. to generate an OTP or to generate a signature or to decrypt or encrypt data) and returning the result if the PIN and/or password is correct. In some embodiments the apparatus may be further adapted to store a reference value wherein said verifying of said obtained PIN and/or password value may comprise the apparatus comparing said obtained PIN and/or password value with said reference value.

In some embodiments the apparatus may delegate the verification of the PIN and/or password to said external removable key storage device. In some embodiments the apparatus may further comprise a second communication interface for receiving and exchanging commands and responses with an external removable device wherein said verifying of said obtained PIN and/or password value may comprise: said apparatus communicating to said external removable device over said second communication interface a PIN and/or password representing value that represents said obtained PIN and/or password value for the external removable device to verify; and said apparatus receiving from said external removable device over said second communication interface the result of said verification by the external removable device of said representing value.

In some embodiments the apparatus may be an apparatus of any of the previous embodiments further comprising a biometric sensor to capture a biometric measurement a user of said apparatus; said apparatus may be further adapted to obtain said biometric measurement from said user by said biometric sensor and to verify whether said biometric measurement is correct; whereby at least one of said cryptographically combining of the secret key with the first data or said returning of the at least one output file comprising the result of said cryptographically combining may be conditional on said obtained biometric measurement being correct. In some embodiments said biometric sensor may comprise for example a fingerprint sensor and said biometric measurement may comprise fingerprint data of the user. In some embodiments the apparatus may be adapted to verify a biometric measurement of the user and the apparatus may be adapted to only proceed with cryptographically combining of the secret key with the first data (e.g. to generate an OTP or to generate a signature or to decrypt or encrypt data) and returning the result if the biometric measurement is accepted by the apparatus. In some embodiments the apparatus may be further adapted to store biometric reference data wherein said verifying of said obtained biometric measurement may comprise said apparatus comparing said obtained biometric measurement with said biometric reference data.

In some embodiments the apparatus may delegate the verification of the biometric measurement to said external removable key storage device. In some embodiments the apparatus may further comprise a second communication interface for receiving and exchanging commands and responses with an external removable device wherein said verifying of said obtained biometric measurement comprises: said apparatus communicating to said external removable device over said second communication interface said biometric measurement for the external removable device to verify; and said apparatus receiving from said external removable device over said second communication interface the result of said verification by the external removable device of said biometric measurement.

Another aspect of the invention provides a method for generating a digital signature over an electronic input file. In some embodiments the method may be for use with an apparatus of any of the previous embodiments. In some embodiments the method may be for use with an apparatus that may comprise a communication interface for locally connecting the apparatus to a host computer, and the apparatus may be adapted: to present itself to said host computer, when the apparatus is connected to said host computer, as a mass storage device that an application on the host computer can access through a standard mass storage access mechanism for reading and saving files; to receive said input file from said host computer over said communication interface; to generate said digital signature over said input file by applying to said input file a digital signature algorithm that is parameterized by a secret signature key; to return an output file to said host computer over said communication interface whereby said output file comprises said digital signature over said input file. In some embodiments the method may comprise the steps of: making at said host computer a connection with said apparatus; sending at said host computer said input file to the apparatus over said communication interface by saving the input file to the mass storage device presented by the apparatus using a method for saving files of said standard mass storage access mechanism; obtaining at said host computer said output file from the apparatus over said communication interface by reading the output file using a method for reading files of said standard mass storage access mechanism; retrieving said digital signature from said output file.

In some embodiments said communication interface comprises a USB interface and wherein said apparatus is further adapted to present itself to said host computer, when said apparatus is connected to said host computer, as a USB device of the USB Mass Storage Device class.

Yet another aspect of the invention provides a system for generating a digital signature over an electronic input file. In some embodiments the system may comprise an apparatus of any of the previous embodiments. In some embodiments the system may comprise one or more components adapted to perform some or all steps of any of the methods previously described. In some embodiments the system may comprise: a host computer comprising a data processing component for running software applications and a connection mechanism for removably connecting at least one external peripheral device to the host computer, whereby said host computer may be adapted to: support a class of mass storage devices, recognize devices that are connected to said host computer through said connection mechanism as belonging to said class of mass storage devices if said devices advertise themselves as belonging to said class when they are connected to said host computer, support a standard mass storage access mechanism for reading and saving files to mass storage devices connected to the host computer through said connection mechanism and recognized by the host computer as belonging to said class of mass storage devices, offer said software applications a first method of said standard mass storage access mechanism to read files to said mass storage devices and a second method of said standard mass storage access mechanism to save files to said mass storage devices; the system may further comprise: a signature apparatus comprising a communication interface for locally connecting the signature apparatus to said host computer by said connection mechanism, whereby said signature apparatus may be adapted: to present itself to said host computer, when the signature apparatus is connected to said host computer, as belonging to said class of mass storage; to receive said input file from said host computer over said communication interface; to generate said digital signature over said input file by applying to said input file a digital signature algorithm that is parameterized by a secret signature key; to return an output file to said host computer over said communication interface whereby said output file comprises said digital signature over said input file; and whereby: said signature apparatus is connected to said host computer through said communication interface and said connection mechanism; and said host computer is running a signature application adapted to send said input file to the signature apparatus over said communication interface by saving the input file to the apparatus using said second method of said standard mass storage access mechanism for saving files, and to obtain at said host computer said output file from the signature apparatus over said communication interface by reading the output file using said first method of said standard mass storage access mechanism.

In some embodiments said connection mechanism may comprise a host connector or port (such as a USB port) for removably connecting at least one external peripheral device to the host computer and driver software targeting said host connector. In some embodiments the communication interface of said signature apparatus may comprise a peripheral device connector that may match said host connector or port.

In some embodiments said communication interface may comprise a USB interface and said signature apparatus may be further adapted to present itself to said host computer, when said signature apparatus is connected to said host computer, as a USB device of the USB Mass Storage Device class.

In some embodiments said host computer may for example comprise a laptop or a PC (Personal Computer). In some embodiments the application running on the host computer may comprise a client application that allows a user of the host computer to remotely access and/or interact with a remotely accessible computer-based application. For example in some embodiments the application running on the host computer may comprise a web-browser that the user may user to interact with a web-based application running on a remote web-server that may be connected to the host computer over a computer network such as the internet. The application may assemble some data to be signed (e.g. a contract) into an input file and present the input file to the user. The user may connect his or her signature apparatus to the host computer (e.g. on a USB port of the host computer) and the signature apparatus may present itself to the host computer as a mass storage device (e.g. a USB mass storage device). The user may download the file and save the input file with the data to be signed to the signature apparatus (that appears on the host computer as a mass storage device) for example in a directory called 'files to be signed'. The signature apparatus may sign the input file and signal that the signature is ready for retrieval by creating an output file containing the signature, which may have the same name as the input file or may have a fixed name (e.g. 'signature_file') or may be an altered version of the input file name, and may make the output file available in a specific location for example in a directory called 'signatures' and the user may direct the browser to read and upload that output file to the application. In some embodiments the input file may be a text file and the signature apparatus, prior to signing the contents of the input file, may present the text contained in the input file to the user on a display of the signature apparatus. The user may review the presented text and approve (or reject) the presented text by pressing an OK (or Cancel) button on a keypad of the signature apparatus. After the user has approved the presented text the signature apparatus may proceed with signing the input file.

In another example the user may use a client application to interact with an application that requires the user to be authenticated. The client application may obtain a one-time password by reading an output file (that may have a fixed name and location e.g. "credentials/one-time-password") containing a one-time password that the apparatus may generate on the fly when receiving the request to read the output file. The application may then retrieve the one-time password from the output file. In some embodiments the apparatus may generate the one-time password or sign a file by using an asymmetric digital signature algorithm that may be parameterized by a private key of a public-private key pair associated with the user. In some embodiments the application may obtain the public key corresponding with the private key and/or a certificate of the public key (for verifying the signature or one-time password) by reading other specific files that may contain the public key and/or certificate (e.g. "credentials/public-key" or "credentials/certificate"). In other embodiments the public key and/or the certificates may be encoded into the same output file as the signature or one-time password.

In some embodiments an apparatus according to an aspect of the invention comprises or consists of a signature device with a first communication interface for locally connecting the device to a host computer which may comprise a general purpose computing device such as for example a PC (personal computer), or a laptop. In some embodiments the communication interface may comprise a USB interface. In some embodiments the signature device advertises itself to the connected host computer as a device of the USB Mass Storage Device class.

In some embodiments the signature device may be adapted to receive an input file from the host computer that the signature device is connected to by its USB interface whereby the host computer may pass the input file to the signature device by saving the input file to the mass storage device that the signature device presents to the host computer through the standard interface to save a file to a device of the USB Mass Storage Device class. The signature device may then cryptographically process the received input file using a private key of a public-private key pair associated with a user. The signature device may store the result of the cryptographic processing (e.g., a signature or a decrypted file or a one-time password) of the input file in an output file. An application on the host computer may obtain the result by reading the output file from the mass storage device that the signature device presents to the host computer through the standard interface to read a file from a device of the USB Mass Storage Device class.

In some embodiments the signature device may securely store a secret signature key associated with the user and may be adapted to perform cryptographic calculations according to a cryptographic algorithm using the stored secret signature key for signing or decrypting a file. In some embodiments the secret signature key may comprise a private key of a public-private key pair associated with the user and the cryptographic algorithm may comprise an asymmetric cryptographic algorithm such as for example the RSA (Rivest-Shamir-Adleman) algorithm or an Elliptic Curve algorithm. Interface Device for a Smart Card.

In some embodiments the signature device may comprise a second communication interface for communicating with an external removable key storage device that is adapted to store a private key associated with the user and to perform cryptographic calculations according to an asymmetric cryptographic algorithm using the stored private key. In some embodiments the signature device may delegate at least some of the cryptographic calculations involving the private key (for example for singing or decrypting a file or for generating an OTP) to the key storage device. In some embodiments the second communication interface may comprise a smart card interface and the key storage device may comprise a smart card. In some embodiments the smart card may be an ISO 7816 compatible smart card and the second communication interface may be ISO 7816 compatible. In some embodiments the smart card may be a PKI enabled smart card.

Emulation of cryptographic library, smart card reader and/or smart card driver.

In some embodiments the signature device may be used to emulate one or more of a cryptographic library, USB smart card reader and USB smart card driver (including a combination of all three), thus removing the need for one or more of these to be present or installed on the host computer of the user.

For example in some embodiments an application seeking to obtain a signature over an electronic file such as an electronic document whereby the signature is generated with the private key associated with a user and securely stored on for example a smart card of the user, may proceed as follows. Instead of interfacing with a standard cryptographic API such as PKCS#11 or MS-CAPI to get the electronic document signed by the private key associated with the user and stored on the user's smart card, the application may transfer a file to be signed to the signature device using the standard interface to save a file comprising the electronic document to a device of the USB Mass Storage Device class. The signature device may then take care of generating the signature over the electronic document by interacting with the smart card using the existing smart card commands for generating a signature. For example the signature device may receive an input file with the electronic document to be signed from the application on the host computer through the standard USB Mass Storage Device class interface to save a file to the signature device. The signature device may then generate a message digest of the received electronic document (e.g., using a hashing algorithm such as for example SHA-1) and use ordinary existing smart card commands to pass the generated message digest to the smart card, to instruct the smart card to generate a signature over the message digest and to receive the generated signature from the smart card. The signature device may then save the received signature in an output file and the application may retrieve this output file containing the signature by reading the output file from the signature device through the standard USB Mass Storage Device class interface to read a file from the signature device.

Signing an Electronic File.

In some embodiments the signature device may be used to sign an electronic file in the following way. The application may transfer the file to be signed (which may also be referred to as the input file) to the signature device by using the standard USB Mass Storage Device class interface to save a file to the signature device. Upon receiving the input file the signature device may generate a signature over the received input file using the private key associated with the user. Once the signature device has generated the signature, the signature device may make available for read-out an output file containing the generated signature. The application may obtain the signature by reading this signature file or output file by using the standard USB Mass Storage Device class interface to read a file from the signature device as will be described in more detail below.

In some embodiments the output file is in a standard signature format. In some embodiments the output file comprises both the data of the original file to be signed and the actual signature. In some embodiments the format of the output file may be determined by the format of the input file. In some embodiments the signature device may process the input file to be signed on the fly while the input file is being received and may not store the entire input. For example in some embodiments the signature device may generate on the fly a message digest over the input file, may discard the original contents of the input file once they have been used to generate the message digest and may use the message digest to generate the signature.

Decrypting an Electronic File.

In some embodiments the signature device may be used to decrypt an electronic file that has been encrypted with the public key that corresponds to the private key associated with the user. The application may transfer the file to be decrypted (which may also be referred to as the input file) to the signature device by using the standard USB Mass Storage Device class interface to save a file to the signature device. Upon receiving the input file the signature device may decrypt the received input file using the private key associated with the user. Once the signature device has decrypted the input file, the signature device may make available for read-out an output file comprising the decrypted file. The application may obtain the signature by reading this decrypted file or output file by using the standard USB Mass Storage Device class interface to read a file from the signature device as will be described in more detail below.

Generating a One-Time Password.

In some embodiments the signature device may be used to generate one-time passwords whereby the private key of the user is used to sign a dynamic variable the value of which is known (or made to be known) to both the signature device and an entity that will verify the one-time password (OTP). In some embodiments the one-time password may comprise the signature over the dynamic variable. In some embodiments the dynamic variable is generated and/or maintained by the signature device. For example in some embodiments the signature device may comprise a clock for generating a time value which the signature device may use to determine the value of the dynamic variable for generating a time-based OTP. In other embodiments the signature device may store and maintain in memory an event related value that it updates upon certain events and the signature device may use this event related value to determine the value of the dynamic variable for generating an event-based OTP. For example in some embodiments the signature device may update the event related value each time that the signature device generates a one-time password. In some embodiments the event related value may be a counter and updating the event related value may comprise incrementing the counter. In some embodiments updating the event related value may comprise the signature device replacing the current value of the event related value by a new value that the signature device may calculate from the current value of the event related value. In some embodiments the signature device may calculate the new value of the event related value for example by applying a hashing function to the current value of the event related value.

Once the signature device has generated the one-time password, the signature device may make available for read-out an output file containing the one-time password. The application may obtain the signature by reading this signature file or output file by using the standard USB Mass Storage Device class interface to read a file from the signature device as will be described in more detail below. In some embodiments the generation by the signature device of the one-time password may be prompted by a read request through the standard USB Mass Storage Device class interface to read the file with the one-time password. In some embodiments (e.g., in case of a time-based OTP) the signature device may, upon receiving the request from the host computer to read-out the one-time password output file, on-the-fly calculate the one-time password, update the contents of the one-time password output file with the freshly generated OTP and return the updated OTP output file to the host computer. In some embodiments (e.g., in case of an event-based OTP) the signature device may calculate a new one-time password and update the contents of the OTP output file with the newly calculated value of the OTP after the host computer has read-out the OTP output file.

In some embodiments the OTP output file may, in addition to the value of the one-time password, also comprise the value of the dynamic variable that was used by the signature device to calculate the OTP.

In some embodiments the OTP output file may comprise the value of the OTP in a human readable format. In some embodiments the OTP output file may for example be a text file and the OTP may for example be coded in ASCII format. In some embodiments the user may open the output file containing the one-time password with for example a file manager application on the host computer, copy the text in the output file containing the OTP and paste this copied OTP into an application.

Receiving the Input File.

In some embodiments the signature device is adapted to sign or decrypt any file that it receives through the standard USB Mass Storage Device class interface to save a file to the signature device. In some embodiments the signature device may be adapted to sign or decrypt any file whose file name complies with a certain format. For example in some embodiments the signature device may be adapted to sign any file that it receives through the standard USB Mass Storage Device class interface to save a file to the signature device that has a specific file name (e.g., "input_file_to_be_signed") and/or similarly decrypt any file that has another specific file name (e.g. "input_file_to_be_decrypted"). In some embodiments the signature device may be adapted to sign any file that it receives through the standard USB Mass Storage Device class interface to save a file to the signature device that has a specific file path or that is being saved to a specific location (e.g., the directory "input_files_to_be_signed") and/or similarly decrypt any file that is received in another specific location (e.g., the directory "input_files_to_be_decrypted").

Making the output file available to the host computer.

In some embodiments the output file may be saved by the signature device under the name and location that was used by standard USB Mass Storage Device class interface for the input file to be formally saved (if applicable, i.e., if an operation is performed involving an input file). I.e., rather than saving the input file itself (as instructed by the USB Mass Storage Device class interface) under a given name and in a given location, the signature device may save the output file under that name and in that location. This may for example be applicable in the case of signing or decrypting a file. In some embodiments the signature device may make the output file available in a fixed location (e.g., in a directory with a fixed path such as "signature_files") and the name of the output file may for example be the same name as the name of the input file that was signed or decrypted. In some embodiments the last generated output file is automatically removed or overwritten when a new output file is generated. In some embodiments the signature device may make the output file available in a fixed location (e.g., in a directory with a fixed path such as "output_files") and under a fixed name (e.g., "one_time_password").

In some embodiments the signature device may be adapted to perform several types of cryptographic operations, such as for example generating a signature over at least some of the contents of an input file, generating a one-time password or encrypting or decrypting at least some of the contents of an input file. In some embodiments the operation to be performed may be indicated in the name or in the structure of the name of the input file. In some embodiments the operation to be performed may be indicated in the name or in the structure of the name of the output file. In some embodiments the operation to be performed may be indicated in the location of the input or output file as expressed in the path of the input or output file. For example if an input file should be signed it may be saved by a signature application in a location having a specific directory name such as for example 'input/to_be_signed'.

In some embodiments the signature device may be adapted to indicate when the output file is available. In some embodiments the signature device indicates that the output file is available by emulating a disconnect event and a reconnect event of the mass storage device that the signature device presents to the host computer. In some embodiments the signature device makes the output file available in another mass storage device than the mass storage device that it presents to the host computer for receiving the input file and connects this other mass storage device with the output file to the host computer when the output file is available.

Public Key and Certificates

In some embodiments the signature device may store a public key corresponding to the aforementioned private key, also stored in the signature device, of the public-private key pair associated with the user. In some embodiments the signature device may additionally store a certificate of this public key which may cryptographically bind the public key with for example the identity of the user.

In some embodiments the public and/or certificate may be available in a file on the signature device. In some embodiments an application on the host computer may obtain the public key and/or certificate by reading this file by using the standard USB Mass Storage Device class interface to read a file from the signature device. In some embodiments this file may be located in a fixed location (e.g., a directory with a specific fixed name such as "certificates"). In some embodiments this file may have a fixed name (such as for example "certificate_file").

In some embodiments the signature device may rely on an external removable key storage device for storing the private key and performing the cryptographic calculations involving the private key, as is described in more detail elsewhere in this application. In such cases the signature device may obtain the public key and/or certificate from the external removable key storage device in an appropriate manner (e.g., in case the external removable key storage device comprises a smart card, by exchanging the applicable smart card commands and responses to read out the public key and certificate) and may store the obtained public key and/or certificate in a file that it makes available to an application on the host computer as described above.

In some embodiments and for some operations, the public key and/or certificate may be comprised in the output file. For example in the case of generating a signature, the public key and certificate may be comprised in the signature output file.

Configuration, Status and Parameterization.

In some embodiments the signature device may be configurable. In some embodiments the current configuration of the signature device may be obtained by reading a configuration file through the standard USB Mass Storage Device class interface for reading a file. In some embodiments the configuration file may have a fixed name and/or a fixed location.

In some embodiments the signature device may be in one of a set of various states at any given time. In some embodiments the current state of the signature device may be obtained by reading a status file through the standard USB Mass Storage Device class interface for reading a file. In some embodiments the status file may have a fixed name and/or a fixed location.

In some embodiments certain operations of the signature device (for example the signature operation to sign an input file) may be configurable. For example in some embodiments the choice of the hashing algorithm to generate a message digest of the contents of an input file to be signed may be parameterizable. In some embodiments an operation of the signature device may be parameterized by saving a parameter file to the signature device before the operation is performed by the signature device.

Firmware Update

In some embodiments the signature device is adapted to allow an update of its firmware. In some embodiments the firmware of the signature device may be updated by saving a firmware update file to the signature device whereby the firmware update file may have a specific file name or may be saved in a specific location. In some embodiments the signature device may require that the firmware update file be signed by a trusted authority. In some embodiments the signature device is adapted to verify the signature over the firmware update file and to update its firmware with the contents of the received firmware update file only if it finds the signature to be valid.

User Approval and PIN Entry.

In some embodiments usage of the private key in cryptographic operations (e.g., to generate a signature or to decrypt a file) may be subject to user approval. In some embodiments the signature device is adapted to obtain such approval from the user. In some embodiments the signature device may comprise a user input interface for obtaining a user approval. In some embodiments the signature device may for example comprise an OK button which the user may actuate to indicate approval. In some embodiments the usage of the private key may be protected by a personal identification number (PIN) and/or password. In some embodiments the user may be required to enter a PIN and/or password that may be compared to a reference PIN and/or password and the signature device may proceed to carry out an operation involving the cryptographic usage of the private key if the PIN and/or password provided by the user matches the reference PIN and/or password. In some embodiments the signature device may comprise a user input device adapted to allow the user to provide the value of a PIN and/or password to the signature device. In some embodiments the user may enter the PIN and/or password on the host computer and the host computer may pass the PIN and/or password to the signature device by saving a file comprising the PIN and/or password to the signature device through the standard USB Mass Storage Device class interface to save a file to the signature device. In some embodiments this file with the PIN and/or password may be saved with a fixed name or may be saved in a fixed location. In some embodiments the PIN and/or password may be comprised in the same file that also holds an input file (e.g., a file to be signed or decrypted) to be processed by the signature device. In some embodiments the signature device may be adapted to store a PIN and/or password reference value and compare the PIN and/or password received from the user with the stored reference PIN and/or password value. In some embodiments the signature device may be adapted to pass the PIN and/or password received from the user to an external removable key storage device.

Using Symmetric Cryptography.

In some embodiments the signature device may be adapted to store a secret cryptographic key that is shared with a verification entity. In some embodiments the signature device may be adapted to support symmetric cryptographic algorithms. In some embodiments the signature device may generate one-time passwords by cryptographically combining this shared key with a dynamic variable (which the signature device may obtain as described above) using a symmetric cryptographic algorithm (for example a symmetric encryption algorithm such as AES (Advanced Encryption Standard) or a keyed-hash algorithm such as HMAC) and the signature device may save the resulting one-time password in an output file which may be retrieved by the host computer as described above. In some embodiments the signature device may be adapted to generate a Message Authentication Code (MAC) over an input file that it received through the standard USB Mass Storage Device class interface to save a file to the signature device as described above, and save the resulting MAC in an output file which may be retrieved by the host computer as described above. In some embodiments the signature device may generate the MAC using a symmetric cryptographic algorithm (for example a symmetric encryption algorithm such as AES or a keyed-hash algorithm such as HMAC) parameterized with the shared key. In some embodiments the signature device may encrypt or decrypt an input file (received as described above) with a symmetric encryption/decryption algorithm (such as AES) and store the resulting encrypted or decrypted file in an output file which may be retrieved by the host computer as described above.

Secure Device.

In some embodiments the signature device may have its own user output interface which for example may comprise a display. In some embodiments the signature device may have its own user input interface which for example may comprise a keypad. In some embodiments the user input interface and the user output interface may be non-removable and not user-serviceable, fully controlled by the device, and immune from interference by malicious software on a host computer. In such embodiments the device can therefore be considered to have a trustworthy user interface in contrast to, for example, PCs where there is always the possibility that malicious software such as a virus or a Trojan presents fake messages to the user, or captures whatever the user enters on the keypad, or reads in memory sensitive data associated with a security application or alters data before they are being signed. In some embodiments the firmware of the device may not be alterable. In some embodiments the device may have tamper evident provisions.

Other Characteristics

In some embodiments the signature device may have its own autonomous source of electrical power such as for example a battery. In some embodiments the signature device may be electrically powered through the USB connection.

In some embodiments the signature device may be portable and light-weight. In some embodiments the signature device weighs less than 200 grams. In some embodiments the signature device may be compact and hand-held. In some embodiments the signature device may be pocket-sized. In some embodiments the size of the signature device is maximally 15 cm in any direction. In some embodiments the length of the signature device is less than 15 cm, the width is less than 8 cm and the thickness is less than 2 cm.

In some embodiments the signature device may have the form of a USB key or a USB memory stick. In some embodiments the signature device may have the form of a USB smart card reader.

BRIEF DESCRIPTION OF THE DRAWINGS

The foregoing and other features and advantages of the invention will be apparent from the following, more particular description of embodiments of the invention, as illustrated in the accompanying drawings.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention.

Figure 1:
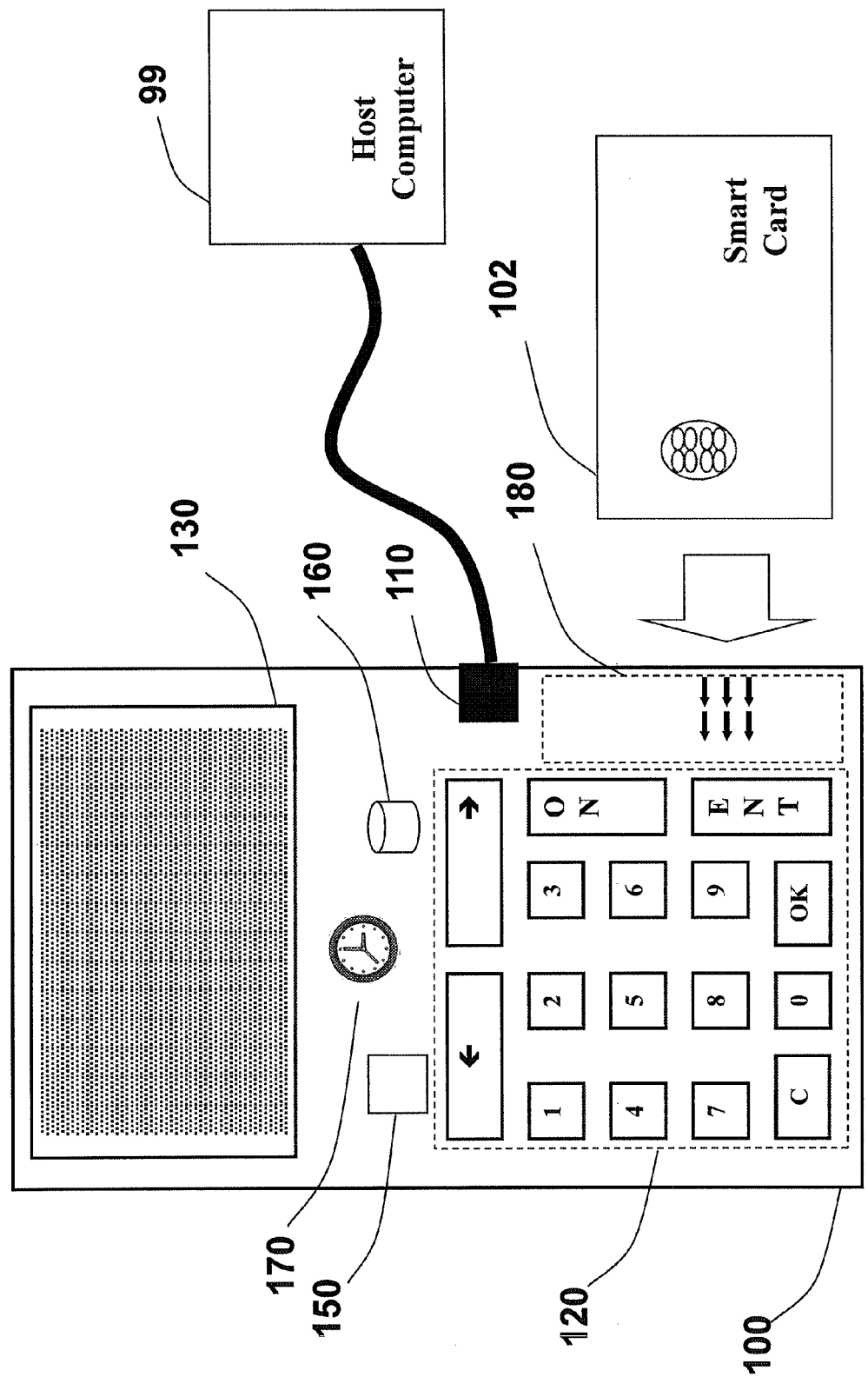
FIG. 1 schematically illustrates an exemplary apparatus according to an aspect of the invention.

FIG. 1 schematically illustrates an exemplary apparatus (100) of the invention (e.g., a signature device) according to an aspect of the invention. The apparatus may comprise: a first communication interface (110) to locally connect the apparatus to a host computer (99), and one or more processing components (150) for processing data and/or controlling other components of the apparatus such as the first communication interface.

In some embodiments the apparatus may present itself to the connected host computer (99) as a mass storage device to which the connected host can save files and from which the connected host can read files. In some embodiments the first communication interface may comprise a USB interface and the apparatus may present itself to the connected host computer as a USB device of the USB Mass Storage Device class. In some embodiments the first communication interface may comprise a connector such as a USB connector. In some embodiments the first communication interface may comprise a cable.

In some embodiments the apparatus is adapted to receive an input file from the host computer through the standard USB Mass Storage Device class interface for saving a file on a device of the USB Mass Storage Device class, to cryptographically process the received file using an asymmetric cryptographic algorithm parameterized with a private key of a public-private key pair associated with a user, to store the result of said cryptographic processing in an output file, and to return the output file to the host computer upon a request from the host computer to read the output file through the standard USB Mass Storage Device class interface for reading a file from a device of the USB Mass Storage Device class.

In some embodiments the apparatus further comprises a human output interface (130) to present data and/or messages to the user. In some embodiments the apparatus further comprises a human input interface (120) for receiving inputs from the user. In some embodiments the human input interface may be adapted to capture an approval of the user. In some embodiments the human input interface may be adapted to receive a PIN and/or password entered by the user.

In some embodiments the apparatus may comprise one or more memory components (160). In some embodiments the one or more memory components may be adapted to store said private key. In some embodiments the apparatus may be further adapted to perform cryptographic calculations with this private key for carrying out the asymmetric cryptographic algorithm mentioned above.

In some embodiments the apparatus further comprises a second communication interface (180) for communicating with an external removable key storage device (102). In some embodiments the external removable key storage device may be adapted to securely store the private key associated with the user (e.g., in a memory; not shown) and to perform cryptographic calculations using this private key (e.g., with a data processing component; not shown). In some embodiments the apparatus is further adapted to delegate to the external removable key storage device at least some of the cryptographic calculations required to perform the asymmetric cryptographic algorithm for processing the received file. In some embodiments the external removable key storage device may comprise a smart card, which may be for example a PKI smart card.

In some embodiments the apparatus may further comprise a clock (170) for providing a time value. In some embodiments the apparatus may be adapted to use this time value as a dynamic variable for generating a one-time password, for example by signing the time value with the private key associated with the user.

Figure 2:
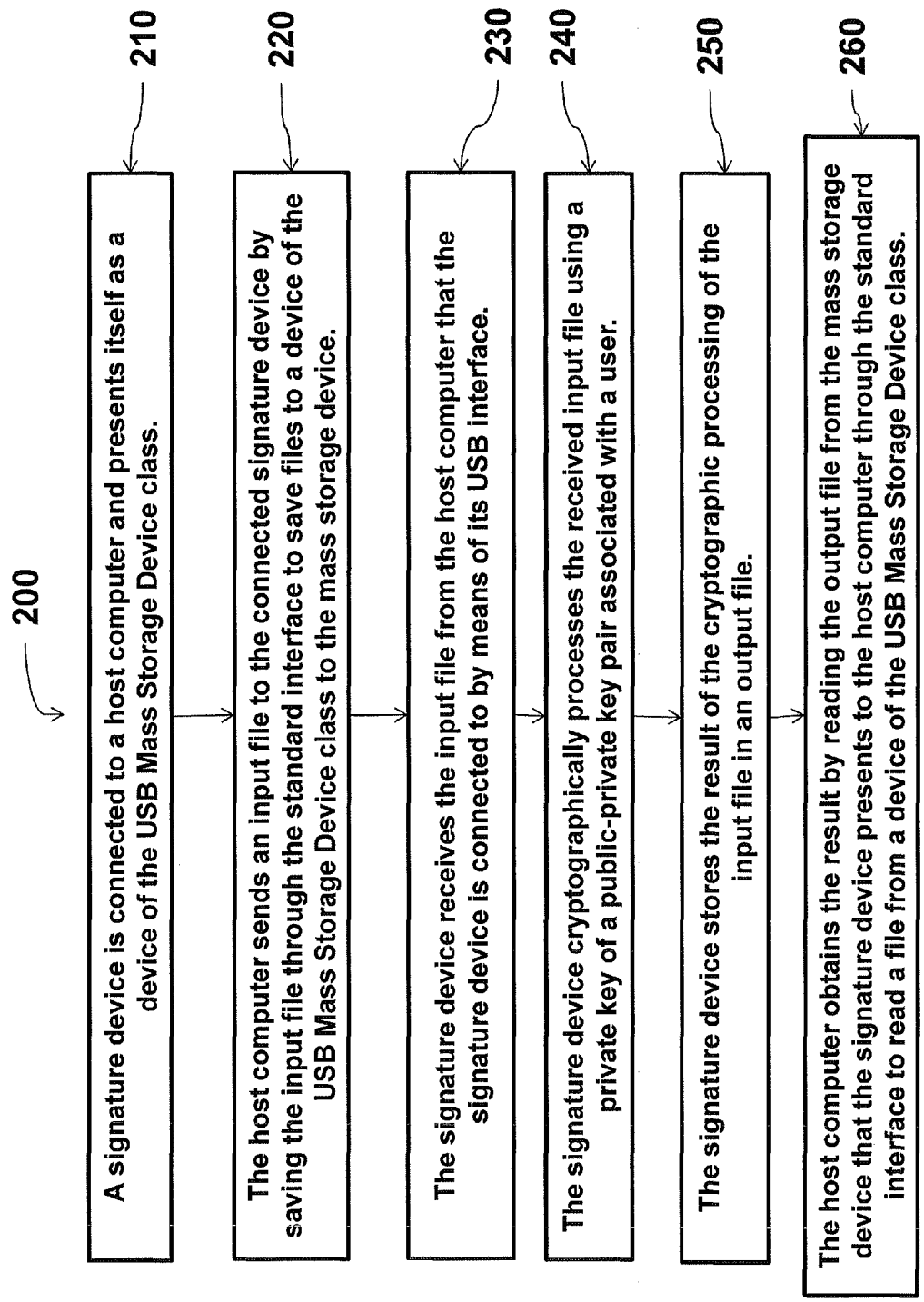
FIG. 2 is a flow chart of steps for generating a digital signature over an electronic file in accordance with aspects of the invention.

FIG. 2 schematically illustrates an exemplary method (200) of the invention according to another aspect of the invention. The apparatus may comprise the following steps. Step 210: In some embodiments a signature device may be connected to a host computer and present itself as a device of the USB Mass Storage Device class. Step 220: The host computer may send an input file to the connected signature device by saving the input file through the standard interface to save a file to a device of the USB Mass Storage Device class to the mass storage device that the signature device presents to the host computer. Step 230: The signature device may receive the input file from the host computer that the signature device is connected to by its USB interface. Step 240: The signature device may then cryptographically process the received input file using a private key of a public-private key pair associated with a user. Step 250: The signature device may store the result of the cryptographic processing (e.g., a signature or a decrypted file or a one-time password) of the input file in an output file. Step 260: The host computer may obtain the result by reading the output file from the mass storage device that the signature device presents to the host computer through the standard interface to read a file from a device of the USB Mass Storage Device class.

Figure 3:
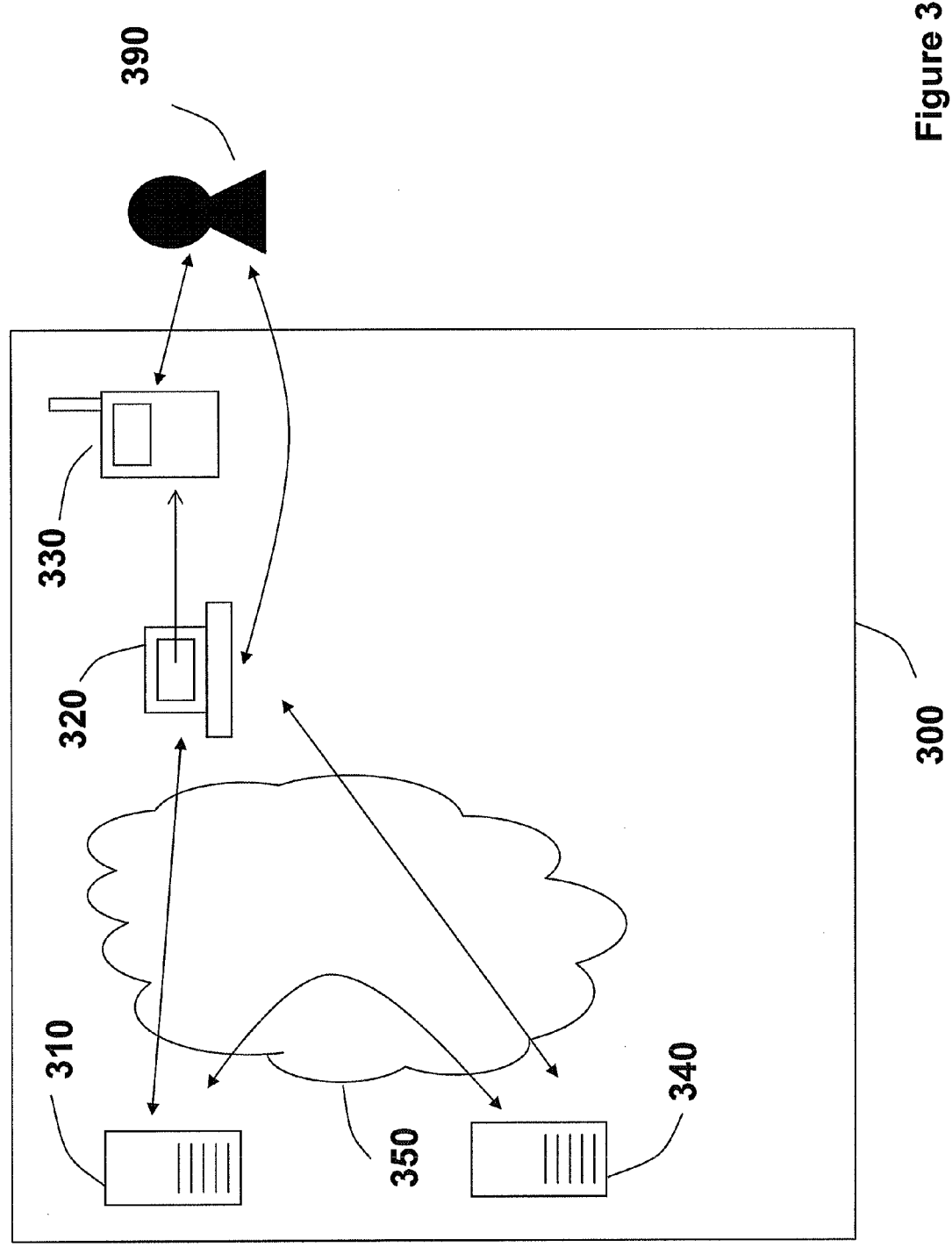
FIG. 3 is a block diagram of a system for generating a digital signature over an electronic file in accordance with aspects of the invention.

FIG. 3 schematically illustrates an exemplary system (300) of the invention according to another aspect of the invention. The system may comprise: an application server (310) for hosting a remotely accessible application; an access device (320) for allowing a user (390) to interact with the remotely accessible application hosted by the application and whereby the application server and the access device may communicate with each other over a public telecommunications or computer network (350) such as the internet; a signature device (330) that is locally connected to the access device whereby the signature device may comprise an apparatus as described in connection to FIG. 1 and whereby the signature device is adapted to receive via the access device an input file containing an electronic file (e.g., an electronic document) to be signed with a private key associated with the user, to generate a signature over the received electronic file and to return an output file to the host containing the signature. In some embodiments the system may comprise a verification component (340) for verifying the generated signature. In some embodiments the signature may be obtained using the method described in connection to FIG. 2.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature of the present invention may have been disclosed with respect to only one of several implementations, such feature may be combined with one or more other features of the other implementations as may be desired and advantageous for any given or particular application. While various embodiments of the present invention have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations of the present invention are possible. Thus, the breadth and scope of the present invention should not be limited by any of the above described exemplary embodiments but should be defined only in accordance with the following claims and their equivalents.

The invention claimed is:

1. An apparatus comprising:
a communication interface configured to physically locally connect the apparatus to a host computer; and
a data processing component adapted to provide a cryptographic processing result generated by cryptographically combining a cryptographic secret key with first input data; whereby
the apparatus is adapted to present itself to said host computer, when it is connected to said host computer by the communication interface, as a mass storage device that an application on the host computer can access through a standard mass storage access mechanism for exchanging files;
the apparatus is adapted to generate an output file and the communication interface is adapted to return the output file to said host computer over said communication interface whereby said output file comprises the cryptographic processing result, and said host computer obtains said output file by reading said output file from the apparatus over said communication interface through a mechanism for reading files of said standard mass storage access mechanism; and
the apparatus is further adapted to generate a one-time password whereby said one-time password is comprised in said result of said cryptographically combining of said cryptographic secret key with said first input data and whereby said first input data comprises a dynamic variable; and (1) whereby the apparatus further comprises a clock and said dynamic variable is based on a time value provided by the clock; or
(2) whereby the apparatus further comprises a first memory component to store a second variable and the apparatus is further adapted to determine a value of said dynamic variable as a function of said stored second variable and to update and store the value of the second variable when the value of the second variable has been used for said combining.

2. The apparatus of claim 1 wherein said communication interface comprises a Universal Serial Bus (USB) interface and wherein the apparatus is further adapted to present itself to said host computer, when said apparatus is connected to said host computer, as a USB device of a USB Mass Storage Device class.

3. The apparatus of claim 1 further comprising:
a second memory component adapted to store said cryptographic secret key;
wherein said data processing component is adapted to perform cryptographic calculations with said cryptographic secret key;
whereby said cryptographically combining said cryptographic secret key with said first input data comprises said data processing component performing said cryptographic calculations.

4. The apparatus of claim 1 further comprising:
a second communication interface for receiving and exchanging commands and responses with an external removable key storage device, said key storage device comprising a key storage device memory component adapted to store said cryptographic secret key and a key storage device data processing component adapted to perform cryptographic calculations with said cryptographic secret key; whereby said cryptographically combining said cryptographic secret key with said first input data comprises said key storage device data processing component performing said cryptographic calculations with said cryptographic secret key.

5. The apparatus of claim 4 whereby said second communication interface comprises an International Organization for Standardization (ISO) 7816 compatible smart card interface and said commands and responses comprise smart card commands and responses, and whereby said key storage device comprises a smart card.

6. The apparatus of claim 1 further comprising a user input interface for a user of said apparatus to indicate an approval, whereby the apparatus is adapted to capture by said user input interface said approval by the user and whereby at least one of said cryptographically combining of the secret key with the first data or said returning of the output file comprising the result of said cryptographically combining is conditional on the apparatus obtaining said approval.

7. The apparatus of claim 1 wherein said cryptographic secret key comprises a symmetric secret key that is shared with an application and whereby said cryptographically combining said cryptographic secret key with said first input data comprises performing on said first input data a symmetric cryptographic algorithm parameterized with said symmetric secret key.

8. The apparatus of claim 1 wherein said cryptographic secret key comprises a secret private key of an asymmetric public-private key pair and whereby said cryptographically combining said cryptographic secret key with said first input data comprises performing on said first input data an asymmetric cryptographic algorithm parameterized with said secret private key.

9. The apparatus of claim 8 further adapted to make available to said host computer a public key file that comprises a public key of said public-private key pair and whereby said host computer obtains said public key file by reading the public key file from the apparatus over said communication interface through said mechanism for reading files.

10. The apparatus of claim 8 further adapted to make available to said host computer a certificate file that comprises one or more certificates associated with said public-private key pair and whereby said host computer obtains said certificate file by reading the certificate file from the apparatus over said communication interface through said mechanism for reading files.

11. The apparatus of claim 1 further comprising a user input interface for a user of said apparatus to provide to said apparatus at least one of a PIN value or a password value; said apparatus further adapted to obtain from said user the at least one of said PIN value or said password value by said user input interface and to verify whether the at least one of said PIN value or said password value is correct; whereby said cryptographically combining of the secret key with the first data or said returning of the output file comprising the result of said cryptographically combining is conditional on the at least one of said PIN value or said password value provided by the user being correct.

12. The apparatus of claim 11 further adapted to store a reference value wherein said verifying of the at least one of said obtained PIN value or said obtained password value comprises said apparatus comparing the at least one of said obtained PIN value or said obtained password value with said reference value.

13. The apparatus of claim 11 further comprising a second communication interface for receiving and exchanging commands and responses with an external removable device wherein said verifying of the at least one of said obtained PIN value or said obtained password value comprises:
  said apparatus communicating to said external removable device over said second communication interface at east one of a PIN representing value or a password representing value that represents the at least one of said obtained PIN value or said obtained password value for the external removable device to verify; and
  said apparatus receiving from said external removable device over said second communication interface the result of said verification by the external removable device of said at least one of a PIN representing value or a password representing value.

14. The apparatus of claim 1 further comprising a biometric sensor to capture a biometric measurement of a user of said apparatus; said apparatus further adapted to obtain said biometric measurement from said user by said biometric sensor and to verify whether said biometric measurement is correct; whereby at least one of said cryptographically combining of the secret key with the first data or said returning of the output file comprising the result of said cryptographically combining is conditional on said obtained biometric measurement being correct.

15. The apparatus of claim 14 further adapted to store biometric reference data wherein said verifying of said obtained biometric measurement comprises said apparatus comparing said obtained biometric measurement with said biometric reference data.

16. The apparatus of claim 14 further comprising a second communication interface for receiving and exchanging commands and responses with an external removable device wherein said verifying of said obtained biometric measurement comprises:
  said apparatus communicating, to said external removable device over said second communication interface said biometric measurement for the external removable device to verify; and
  said apparatus receiving from said external removable device over said second communication interface the result of said verification by the external removable device of said biometric measurement.

17. A method for obtaining a digital signature over an electronic input file for use with an apparatus comprising a communication interface configured to physically locally connect the apparatus to a host computer, a user output interface for presenting outputs to a user of said apparatus, and a user input interface for capturing inputs from said user,
  whereby the apparatus is adapted:
    to present itself to said host computer, when the apparatus is connected to said host computer, as a mass storage device that an application on the host computer can access through a standard mass storage access mechanism for reading and saving files;
    to receive said input file from said host computer over said communication interface;
    to recognize a format of at least one of a plurality of possible file type formats of said input file;
    to read said at least some contents of said input file;
    to present said at least some contents to said user by said user output interface;
    to capture from said user by said user input interface at least one of an approval or a rejection by said user of said at least some contents presented to the user;
    to generate said digital signature over said input file by applying to said input file a digital signature algorithm that is parameterized by a secret signature key;
    to generate and return an output file to said host computer over said communication interface whereby said output file comprises said digital signature over said input file;
    whereby at least one of the generation of said digital signature or the generation and return of said output file comprising said digital signature is conditional on the apparatus obtaining said approval;
  the method comprising the steps of:
    making at said host computer a connection with said apparatus;
    sending at said host computer said input file to the apparatus over said communication interface by saving the input file to the mass storage device presented by the apparatus using a method for saving files of said standard mass storage access mechanism;
    obtaining at said host computer said output file from the apparatus over said communication interface by reading the output file using a method for reading files of said standard mass storage access mechanism;
    retrieving said digital signature from said output file.

18. The method of claim 17 wherein said communication interface comprises a Universal Serial Bus (USB) interface and wherein said apparatus is further adapted to present itself to said host computer, when said apparatus is connected to said host computer, as a USB device of the USB Mass Storage Device class.

19. A system for generating a digital signature over an electronic input file comprising:
- a host computer comprising
    - a data processing component for running software applications,
    - a connection mechanism for removably connecting at least one external peripheral device to the host computer
    - said host computer adapted to:
    - support a class of mass storage devices;
    - recognize devices that are connected to said host computer through said connection mechanism as belonging to said class of mass storage devices if said devices advertise themselves as belonging to said class when they are connected to said host computer;
    - support a standard mass storage access mechanism for reading and saving files to mass storage devices connected to the host computer through said connection mechanism and recognized by the host computer as belonging to said class of mass storage devices;
    - offer said software applications a first method of said standard mass storage access mechanism to read files from said mass storage devices and a second method of said standard mass storage access mechanism to save files to said mass storage devices;
- the system further comprising:
- a signature apparatus comprising a communication interface configured to physically locally connect the signature apparatus to said host computer by said connection mechanism, a user output interface for presenting outputs to a user of said apparatus, and a user input interface for capturing inputs from said user, whereby said signature apparatus is adapted:
    - to present itself to said host computer, when the signature apparatus is connected to said host computer, as belonging to said class of mass storage;
    - to receive said input file from said host computer over said communication interface;
    - to recognize a format of at least one of a plurality of possible file type formats of said input file;
    - to read at least some contents of said input file;
    - to present said at least some contents to said user by said user output interface;
    - to capture from said user by said user input interface at least one of an approval or a rejection by said user of said at least some contents presented to the user;
    - to generate said digital signature over said input file by, applying to said input file a digital signature algorithm that is parameterized by a secret signature key;
    - to generate and return an output file to said host computer over said communication interface whereby said output file comprises said digital signature over said input file, whereby at least one of said generation of said digital signature or said generation and return of said output file comprising said digital signature is conditional on the apparatus obtaining said approval; and
- whereby:
- said signature apparatus is connected to said host computer through said communication interface and said connection mechanism; and
- said host computer is running a signature application adapted to:
    - send said input file to the signature apparatus over said communication interface by saving the input file to the apparatus using said second method of said standard mass storage access mechanism for saving files;
    - obtain at said host computer said output file from the signature apparatus over said communication interface by reading the output file using said first method of said standard mass storage access mechanism.

20. The system of claim 19 wherein said communication interface comprises a Universal Serial Bus (USB) interface and wherein said apparatus is further adapted to present itself to said host computer, when said apparatus is connected to said host computer, as a USB device of a USB Mass Storage Device class.

21. An apparatus comprising:
- a communication interface configured to physically locally connect the apparatus to a host computer; and
- a data processing component adapted to provide a cryptographic processing result generated by cryptographically combining a cryptographic secret key with first input data;
- whereby
- the apparatus is adapted to present itself to said host computer, when it is connected to said host computer by the communication interface, as a mass storage device that an application on the host computer can access through a standard mass storage access mechanism for exchanging files; and
- the apparatus is adapted to generate an output file and the communication interface is adapted to return the output file to said host computer over said communication interface whereby said output file comprises the cryptographic processing result, and said host computer obtains said output file by reading said output file from the apparatus over said communication interface through a host computer mechanism for reading files of said standard mass storage access mechanism; and
- whereby the apparatus is further adapted to generate a digital signature over at least some contents of an input file whereby:
    - said communication interface is further adapted to receive said input file from said host computer whereby said host computer sends the input file to the apparatus over said communication interface by saving the input file to the mass storage device presented by the apparatus through a host computer mechanism for saving files of said standard mass storage access mechanism;
    - said first input data are based on a value that represents said at least some contents of the input file; and
    - said digital signature is comprised in said result of said cryptographically combining of said cryptographic secret key with said first input data; and
- the apparatus further comprising a user output interface for presenting outputs to a user of said apparatus and a user input interface for capturing inputs from said user;
- the apparatus further adapted to:
    - recognize a format of at least one of a plurality of possible file type formats of said input file;
    - read said at least some contents of said input file;
    - present said at least some contents to said user by said user output interface; and
    - capture from said user by said user input interface at least one of an approval or a rejection by said user of said at least some contents presented to the user;
- whereby said cryptographically combining of the secret key with the first data or said returning of the output file comprising the result of said cryptographically combining is conditional on the apparatus obtaining said approval.

22. The apparatus of claim 21 wherein said at least some contents of said input file comprise the entire input file.

23. The apparatus of claim 21 wherein said communication interface comprises a Universal Serial Bus (USB) interface and wherein the apparatus is further adapted to present itself to said host computer, when said apparatus is connected to said host computer, as a USB device of a USB Mass Storage Device class.

24. The apparatus of claim 21 further comprising:
a memory component adapted to store said cryptographic secret key;
wherein said data processing component is adapted to perform cryptographic calculations with said cryptographic secret key;
whereby said cryptographically combining said cryptographic secret key with said first input data comprises said data processing component performing said cryptographic calculations.

25. The apparatus of claim 21 further comprising:
a second communication interface for receiving and exchanging commands and responses with an external removable key storage device, said key storage device comprising a key storage device memory component adapted to store said cryptographic secret key and a key storage device data processing component adapted to perform cryptographic calculations with said cryptographic secret key;
whereby said cryptographically combining said cryptographic secret key with said first input data comprises said key storage device data processing component performing said cryptographic calculations with said cryptographic secret key.

26. The apparatus of claim 25 whereby said second communication interface comprises an International Organization for Standardization (ISO) 7816 compatible smart card interface and said commands and responses comprise smart card commands and responses, and whereby said key storage device comprises a smart card.

27. The apparatus of claim 21 wherein said cryptographic secret key comprises a secret private key of an asymmetric public-private key pair and whereby said cryptographically combining said cryptographic secret key with said first input data comprises performing on said first input data an asymmetric cryptographic algorithm parameterized with said secret private key.

28. The apparatus of claim 27 further adapted to make available to said host computer a public key file that comprises a public key of said public-private key pair and whereby said host computer obtains said public key file by reading the public key file from the apparatus over said communication interface through said host computer mechanism for reading files.

29. The apparatus of claim 27 further adapted to make available to said host computer a certificate file that comprises one or more certificates associated with said public-private key pair and whereby said host computer obtains said certificate file by reading the certificate file from the apparatus over said communication interface through said host computer mechanism for reading files.

30. The apparatus of claim 21 further adapted to obtain from said user at least one of said PIN value or said password value by said user input interface and to verify whether the at least one of said PIN value or said password value is correct; whereby said cryptographically combining of the secret key with the first data or said returning of the output file comprising the result of said cryptographically combining is conditional on the at least one of said PIN value or said password value provided by the user being correct.

31. The apparatus of claim 30 further adapted to store a reference value wherein said verifying of the at least one of said obtained PIN value or said obtained password value comprises said apparatus comparing the at least one of said obtained PIN value or said obtained password value with said reference value.

32. The apparatus of claim 30 further comprising a second communication interface for receiving and exchanging commands and responses with an external removable device wherein said verifying of the at least one of said obtained PIN value or said obtained password value comprises:
said apparatus communicating to said external removable device over said second communication interface at least one of a PIN representing value or a password representing value that represents the at least one of said obtained PIN value or said obtained password value for the external removable device to verify; and
said apparatus receiving from said external removable device over said second communication interface the result of said verification by the external removable device of said at least one of a PIN representing value or a password representing value.

33. The apparatus of claim 21, further comprising a biometric sensor to capture a biometric measurement of a user of said apparatus; said apparatus further adapted to obtain said biometric measurement from said user by, said biometric sensor and to verify, whether said biometric measurement is correct; whereby at least one of said cryptographically, combining of the secret key with the first data or said returning of the output file comprising the result of said cryptographically combining is conditional on said obtained biometric measurement being correct.

* * * * *

UNITED STATES PATENT AND TRADEMARK OFFICE
CERTIFICATE OF CORRECTION

| | | |
|---|---|---|
| PATENT NO. | : 9,495,546 B2 | Page 1 of 1 |
| APPLICATION NO. | : 14/575068 | |
| DATED | : November 15, 2016 | |
| INVENTOR(S) | : Dirk Marien | |

It is certified that error appears in the above-identified patent and that said Letters Patent is hereby corrected as shown below:

In the Claims

Column 21, Line 44 should be corrected to read:

"least one of a PIN representing value or a password"

Signed and Sealed this
Fourteenth Day of February, 2017

Michelle K. Lee
*Director of the United States Patent and Trademark Office*